Nov. 11, 1930.    T. N. PIERSON    1,781,474
ECCENTRIC DRIVE
Filed Feb. 18, 1929
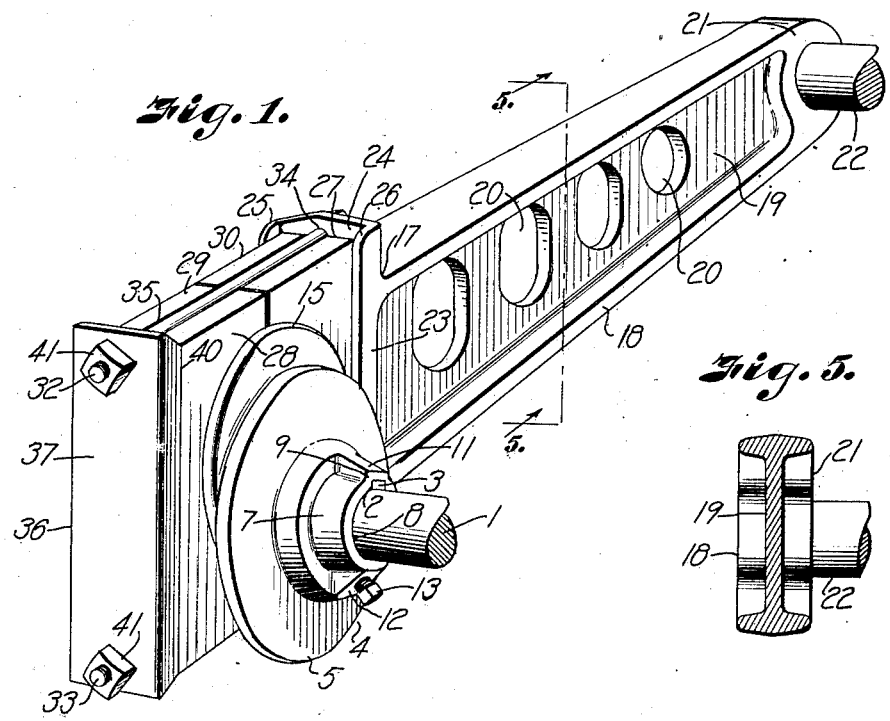
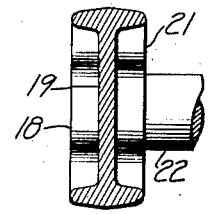
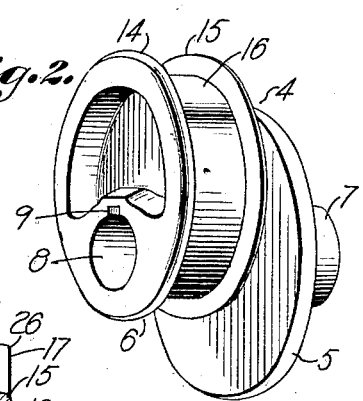
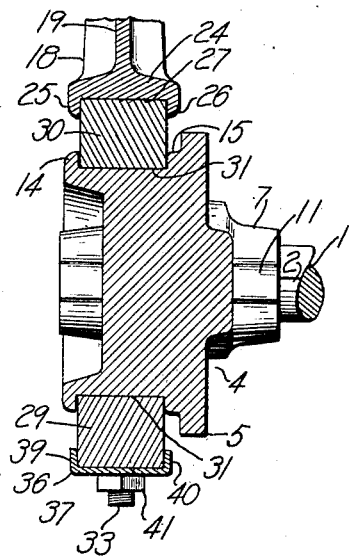
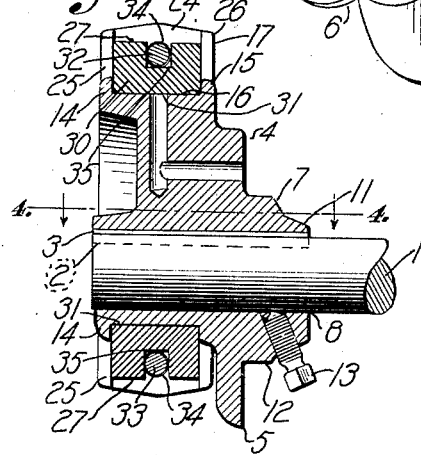
INVENTOR
Torvald N. Pierson.
BY
ATTORNEY Patented Nov. 11, 1930

1,781,474

UNITED STATES PATENT OFFICE

TORVALD N. PIERSON, OF INDEPENDENCE, MISSOURI, ASSIGNOR TO THE GLEANER COMBINE HARVESTER CORPORATION, OF INDEPENDENCE, MISSOURI, A CORPORATION OF DELAWARE

ECCENTRIC DRIVE

Application filed February 18, 1929. Serial No. 340,973.

My invention relates to a power transmitting mechanism and more particularly to an eccentric drive for changing rotary motion to reciprocatory motion, the principal object of the invention being to provide an eccentric drive of simple, inexpensive construction and in which the wearing parts may be readily replaced.

In accomplishing this and other objects of the invention, I have provided improved details of structure, the preferred forms of which are illustrated in the accompanying drawings, wherein:

Fig. 1 is a perspective view of an eccentric and pitman embodying my invention.

Fig. 2 is a perspective view of the eccentric.

Fig. 3 is a vertical sectional view through the eccentric and pitman.

Fig. 4 is a horizontal section on the line 4—4, Fig. 3.

Fig. 5 is a sectional view through the pitman arm on the line 5—5, Fig. 1.

Referring in detail to the drawings:

1 designates a rotary drive shaft having a keyway 2 for receiving a key 3 for attaching an eccentric member 4 to the shaft.

The member 4 is preferably a unitary casting including a disk 5 and a journal 6 having its axis eccentric to the axis of the disk, the disk 5 being provided on its rear face with a hub 7 having a bore 8 continued through the disk and journal to receive the shaft, the bore 8 being provided with a keyway 9 complementary to the keyway in the shaft to receive the key 3 for securing the eccentric member to the shaft and the hub 7 with a reinforcing boss 11 opposite the keyway. The hub is preferably provided with an integral boss 12 which is drilled at an angle to the shaft and threaded to receive a set screw 13 for engaging against the shaft and supplementing the key.

The journal comprises a cylindrical boss cast integral with the disk and having peripheral flanges 14 and 15 to provide an annular seat 16 therebetween for receiving the pitman 17 now described.

The pitman 17 includes an arm 18 of L-shaped cross-section as shown in Fig. 5 and the web 19 of the arm is provided with openings 20 to lighten the structure. The forward end 21 of the arm is bored to receive a shaft 22 which is reciprocated by the pitman. The rear end 23 of the pitman is provided with an integral plate 24 having side flanges 25 and 26 providing a seat 27 for receiving a bearing block 28.

The blocks 28 are preferably constructed of wood or other fibrous material and formed in halves 29 and 30, each provided with a semi-circular seat 31 having a suitable diameter to provide a working fit on the journal when the halves are assembled thereon, and are supported in assembled relation with each other and the pitman arm by bolts 32 and 33 which extend through openings 34 in an end plate 24 of the pitman, through grooves 35 in the blocks and through openings in a keeper plate 36 on the end of the block.

The keeper plate 36 is channel-shape and includes a body portion 37 having spaced flanges 39 and 40 complementary to the flanges on the pitman arm so that the bearing halves may be securely retained between the flanges and the bolts, the bolts being provided with nuts 41 for engaging against the keeper plate.

In assembling a device constructed as described, the eccentric member is keyed to the shaft and the bearing halves assembled on the journal. The pitman arm 18 and the keeper plate 36 are then placed in position with the bearing between them, and the bolts 32 and 33 inserted through the plate on the pitman arm, through the grooves in the bearing, and through the keeper plate, after which the nuts are applied to the bolts and tightened against the keeper plate to complete the assembly.

What I claim and desire to secure by Letters Patent is:

1. In a device of the character described, an eccentric member including a journal, a pitman for the journal comprising an arm having a bearing receiving seat, a bearing for the arm comprising mated halves, grooves in opposite sides of the bearing, a keeper plate, and fastening devices extending through said keeper plate, bearing grooves, and pitman arm to retain the pitman on the journal.

2. In a device of the character described, including an eccentric member having a journal, and a pitman for the journal comprising an arm having a bearing receiving seat, a rectangular-shaped bearing for the arm including mated halves having grooves in their opposite sides, a keeper plate, and fastening devices extending through said keeper plate, bearing grooves, and pitman arm to retain the pitman on the journal.

3. In a device of the character described, a pitman including an arm, a plate at the end of the arm having spaced flanges extending longitudinally thereof to provide a bearing seat therebetween, a rectangular bearing received in the seat having side grooves, a keeper plate complementary to the first named plate for seating the opposite side of the bearing and bolts extending through the keeper plate, bearing grooves, and the plate on the arm to retain the bearing.

4. In a device of the character described, a pitman including an arm, a plate at the end of the arm having spaced flanges extending longitudinally thereof to provide a bearing seat, a bearing for the pitman comprising mated halves, one of which is received in said seat, a keeper plate having spaced, longitudinal flanges to receive the other half of the bearing, and fastening devices extending through the keeper plate, bearing block, and the plate on the arm to retain the bearing.

In testimony whereof I affix my signature.

TORVALD N. PIERSON.